US006556904B1

(12) United States Patent
Larson et al.

(10) Patent No.: US 6,556,904 B1
(45) Date of Patent: Apr. 29, 2003

(54) METHOD AND APPARATUS FOR UPDATE AND ACQUISITION OF AUTOMOTIVE VEHICLE SPECIFICATIONS IN AUTOMOTIVE DIAGNOSTIC EQUIPMENT

(75) Inventors: Timothy A. Larson, Ferguson, MO (US); James M. Smith, Creve Coeur, MO (US)

(73) Assignee: Hunter Engineering Company, Bridgeton, MO (US)

(*) Notice: Subject to any disclaimer, the term of this patent is extended or adjusted under 35 U.S.C. 154(b) by 0 days.

(21) Appl. No.: 09/587,637

(22) Filed: Jun. 5, 2000

Related U.S. Application Data

(63) Continuation-in-part of application No. 09/388,730, filed on Sep. 2, 1999.

(51) Int. Cl.[7] ............................ G06G 7/00; H04Q 1/00; G06F 11/32

(52) U.S. Cl. ............................ 701/33; 701/29; 702/113

(58) Field of Search ............................ 701/29, 35, 33, 701/31; 33/203.18; 356/155; 702/113; 709/220, 221

(56) References Cited

U.S. PATENT DOCUMENTS 4,381,548 A * 4/1983 Grossman et al. .......... 364/551
4,404,639 A * 9/1983 McGuire et al. ............ 364/551
4,441,359 A * 4/1984 Ezoe ........................... 73/117
5,003,479 A * 3/1991 Kobayashi et al. .... 364/424.03
5,034,893 A * 7/1991 Fisher ................... 364/431.01
5,335,420 A * 8/1994 Kling, III et al. ............. 33/288
5,473,772 A * 12/1995 Halliwell et al. ........... 395/650
5,583,797 A * 12/1996 Fluegge et al. ............. 364/552
5,602,919 A * 2/1997 Hurta et al. .................. 380/24
5,657,233 A 8/1997 Cherrington et al. ....... 705/400
5,717,595 A * 2/1998 Cherrington et al. .... 364/464.1
5,732,074 A * 3/1998 Spaur et al. ................ 370/313
5,767,784 A * 6/1998 Khamharn ............. 340/825.31
5,893,113 A 4/1999 McGrath et al. ............ 707/200
5,923,758 A * 7/1999 Khamharn et al. ........... 380/23
5,960,204 A 9/1999 Yinger et al. ................. 717/11
6,052,531 A 4/2000 Waldin, Jr. et al. ........... 717/11
6,052,631 A * 4/2000 Busch et al. .................. 701/29
6,181,994 B1 * 1/2001 Colson et al. ................ 701/33
6,211,907 B1 * 4/2001 Scaman et al. ............. 348/148
6,237,234 B1 * 5/2001 Jackson et al. ............... 33/203
6,282,469 B1 * 8/2001 Rogers et al. ................ 701/29
6,285,932 B1 * 9/2001 de Bellefeuille et al. ..... 701/33

FOREIGN PATENT DOCUMENTS

WO 9851991 11/1998
WO 9923783 5/1999
WO WO 99/23783 * 5/1999

* cited by examiner

*Primary Examiner*—Tan Q. Nguyen
*Assistant Examiner*—Dalena Tran
(74) *Attorney, Agent, or Firm*—Polster, Lieder, Woodruff & Lucchesi, L.C.

(57) ABSTRACT

An apparatus and method for providing automotive vehicle information from a remote system to an automotive service device through a communications link wherein a first processor associated with the automotive service device is configured to obtain automotive vehicle information from a remote system over said communications link, the remote system configured to provide to the first processor an index identifying at least one set of automotive vehicle data available from said remote system such that the first processor can select and access at least one set of automotive vehicle data from the index for display at said automotive service device and for use in the service of an automotive vehicle.

44 Claims, 4 Drawing Sheets

METHOD AND APPARATUS FOR UPDATE AND ACQUISITION OF AUTOMOTIVE VEHICLE SPECIFICATIONS IN AUTOMOTIVE DIAGNOSTIC EQUIPMENT

CROSS-REFERENCE TO RELATED APPLICATIONS

Continuation-in-part of U.S. patent Application Ser. No. 09/388,730 filed Sep. 2, 1999, from which priority is claimed and which is herein incorporated by reference.

STATEMENT REGARDING FEDERALLY SPONSORED RESEARCH OR DEVELOPMENT

Not Applicable.

BACKGROUND OF THE INVENTION

The present invention relates to automotive service equipment, and more particularly to the exchange of electronic data between an automotive service device interconnected via a local or global network such as the Internet to a remote computer system for the transfer of vehicle specifications or automotive service data therefrom, facilitating the service or repair of an automotive vehicle.

As described in co-pending U.S. patent application Ser. No. 09/388,730 herein incorporated by reference, it is desirable that the general purpose computer associated with an automotive diagnostic system such as an automotive wheel alignment system, brake testing system, or vehicle wheel balancer to include an operating system that is fully compatible with local and global computer networks such as the Internet. Examples of such currently available operating systems include the Microsoft Windows™ OS family of products and Palm Computing's Palm operating system. Such systems are capable of running Internet browser software applications, examples of which include Microsoft's Explorer or Netscape's Communicator. Such an automotive diagnostic or wheel alignment system further should provide improved Internet integration of the automotive diagnostic or wheel alignment system when compared to conventional automotive diagnostic or wheel alignment systems. Conventional general purpose computers included in conventional systems often provide access to a network of computers (e.g., LAN) and to the Internet. However, conventional systems generally do not integrate the Internet into associated automotive service, maintenance, repair or inspection software, such as wheel alignment diagnostic software. Instead, the computer operates as would any other PC, configured to browse the Internet without fully integrating the Internet into the system software. Therefore, it is desirable to develop an automotive diagnostic system such as a wheel alignment or wheel balancer system that integrates local or global computer networks such as the Internet into the system software to provide a more efficient and accurate system than is currently available by facilitating access to, and acquisition of, the most current and up-to-date information available for use with the particular diagnostic routine being performed or vehicle undergoing service.

For example, in the vehicle alignment context, vehicle specifications include critical sets of data necessary for vehicle wheel alignment systems, such as manufacturer's specifications, photographic data, instructional data, and service parts data. Traditionally, original vehicle specifications and updates or changes to existing vehicle specifications typically are disseminated to automotive service shops on a yearly basis. The specification and update information typically is stored on a hard drive, floppy disk, CD-ROM, microfilm, or in paper manuals. New vehicle specifications typically are available for wheel alignment systems in the fall to coincide with introduction of the new model year vehicles into the market. However, by the time the specifications and updates are purchased, delivered and installed so as to be accessible to a service or repair technician and implemented in the wheel alignment system, it is usually the spring of the following year (a four to six month lag). Moreover, Technical Service Bulletins (TSBs) often are issued by vehicle manufacturers during the year which change or update information included in the vehicle specifications. Such changes to such specifications and other pertinent information relating to specific vehicles often are not distributed to the automotive service shops until the following annual update of the specifications are released. This may result in a lag of several months in dissemination of critical information. Since the specifications, repair instructions and updates are provided as paper manuals or on microfilm, diskettes or CD-ROMs, further delay may result since the outdated data must be physically removed and replaced with the new data before it can be readily accessed by the technicians. Accordingly, repair and service technicians often are diagnosing and repairing vehicles based upon outdated, incomplete or inaccurate information. Furthermore, even once such information arrives at the service agency and is properly installed, the technician may not take the time to read and apply the revised data when diagnosing and servicing a vehicle.

Therefore, it is desirable to provide an automotive diagnostic system such as a vehicle wheel alignment system that allows for nearly instantaneous information access via a local or global computer network (e.g., the Internet) so that vehicle data sets such as current or new vehicle specifications, updates, and repair instructions can be readily accessed and utilized by service and repair technicians. A basic system for automatically updating static and dynamic files at a network node in response to instructions of an application program is set forth in U.S. Pat. No. 5,473,772 to Halliwell et al. The '772 patent describes a data processing network in which specific and complicated control logic is utilized to coordinate the updating, creation, and deletion of files on a work station computer from a host computer. Similarly, U.S. Pat. No. 5,960,204 to Yinger et al. describes a system and method for automated installation of applications on a networked computer on an as needed basis. The '204 Yinger et al. patent focuses on removing the need for user interaction from the installation process while simultaneously reducing the overhead cost of continually updating application files as newer versions become available.

In contrast, software stored in the general purpose computer should allow a simple automotive diagnostic system such as the vehicle wheel alignment system to connect to the Internet and download the latest, most accurate vehicle specifications provided by the vehicle manufacturers upon demand, or alternatively to facilitate the purchase of an entire set of updated vehicle specifications, as directed by a technician on an as needed basis. Other pertinent information such as Technical Service Bulletins, repair parts information, and pricing also should be readily accessible via the Internet to the technician operating the automotive wheel alignment system. Such Internet connectivity should be integrated into the diagnosis, service, maintenance, repair, and inspection processes so that access to this information requires no advance training or additional computer skill on the part of the service or repair technician. Such an automotive system allows for increased accuracy when diagnosing and servicing vehicles and for increased productivity of the system and technicians utilizing the system.

BRIEF SUMMARY OF THE INVENTION

Among the several objects and advantages of the present invention are:

The provision of an improved vehicle wheel alignment system configured for communication with a remote computer system via a local or global network such as the Internet to receive automotive service data therefrom, as needed;

The provision of the aforementioned improved vehicle wheel alignment system wherein the system is further configured to receive a database of automotive service data from the remote computer system over the network, and to exchange purchase information with the remote computer system for access to the contents of the database;

The provision of the aforementioned improved vehicle wheel alignment system wherein the system is configured to receive and maintain a cryptographic key from the remote computer, the cryptographic key being associated with the vehicle wheel alignment system and providing access to the contents database of automotive service data;

The provision of the aforementioned improved vehicle wheel alignment system wherein the automotive service data received via the network includes vehicle wheel alignment specifications;

The provision of a method for updating reference data on a vehicle wheel alignment system computer, comprising the steps of identifying needed data, establishing a connection to a remote computer storing the needed data, requesting the needed data, receiving the needed data, and utilizing the received data;

The provision of the aforementioned method for updating reference data on a vehicle wheel alignment system wherein the received data is encrypted, and wherein a decryption key associated with the encrypted received data is provided to the vehicle wheel alignment system computer;

The provision of the aforementioned method for updating reference data on a vehicle wheel alignment system wherein the decryption key is additionally associated with subsequent encrypted data installed at the automotive service system;

The provision of an alternative embodiment of a vehicle wheel alignment system having a wheel alignment computer, a remote computer, and a communication system linking the wheel alignment computer and the remote computer, wherein the wheel alignment computer is configured to respond to user-input vehicle information to identify vehicle data needed from the remote computer, and the remote computer is configured to transfer a copy of that data to the wheel alignment computer over the communication system;

The provision of the aforementioned vehicle wheel alignment system wherein the identified vehicle data is updated vehicle data;

The provision of the aforementioned vehicle wheel alignment system wherein the identified vehicle data is new vehicle data;

The provision of the aforementioned vehicle wheel alignment system wherein the communication system is the Internet;

The provision of an alternative method for providing automotive service data to a vehicle wheel alignment system over a communications link including the steps of accessing an index of available automotive service data, selecting over the communications link, the desired automotive service data from the index, accessing the selected automotive service data over the communications link, and utilizing the accessed data at the vehicle wheel alignment system;

The provision of the aforementioned alternative method for providing automotive service data to a vehicle wheel alignment system wherein the communications link is the Internet;

The provision of the aforementioned alternative method for providing automotive service data to a vehicle wheel alignment system wherein the index accessed is a dynamically created web page on a web server;

The provision of the aforementioned alternative method for providing automotive service data to a vehicle wheel alignment system wherein automotive service data is selected by accessing a dynamically created web page containing the desired data;

The provision of the aforementioned alternative method for providing automotive service data to a vehicle wheel alignment system wherein the dynamically created web page containing the desired data is transferred to the vehicle wheel alignment system for storage and subsequent use;

The provision of the aforementioned alternative method for providing automotive service data to a vehicle wheel alignment system wherein the index is inaccessible without proper authorization and identification; and An additional object of the present invention is to provide a host computer that is compatible with local and global computer information networks such as the Internet to allow for improved computer network integration of automotive diagnostic and service systems, for example, automotive wheel alignment systems, for and improved dissemination of automotive information.

Briefly stated, an embodiment of the apparatus of the present invention is of a wheel alignment system that includes at least one sensing device for acquiring automotive data, interface circuitry in communication with the sensing device for generating data representative of automotive data acquired by the sensing device, and a host computer in communication with the interface circuitry for performing a sequence of operations on data generated by the interface circuitry. The host computer provides integrated Internet access to allow for transmission to the vehicle wheel alignment system via the Internet of information necessary to accurately diagnose a vehicle. In the preferred embodiment, the host computer provides integrated Internet access to allow for transmission and receipt of information including, for example, current vehicle specification information data and current wheel alignment software. The current automotive data or vehicle specification information may be acquired either as part of a database of vehicle information purchased online, or may be individually transmitted to the host computer as a dynamically created web page containing all of the necessary vehicle information, repair instructions, parts identifiers, and digital imagery. In some embodiments of the present invention, the transmitted information is encrypted, and may only be accessed with the use of a separate decryption key associated with the encrypted data, which is purchased and received apart from the transmitted information.

As a method, the present invention involves updating, replacing, or adding vehicle reference data, service instructions, parts information and digital imagery to a vehicle wheel alignment system from a remote data storage and distribution computer or processor via a communications link such as the Internet. Upon the identification of a need for update, replacement, or new vehicle reference data, a connection is established between the vehicle wheel alignment system and a remote computer upon which current vehicle reference data is stored. The identified need is communicated to the remote computer, and the corresponding current vehicle reference data is returned, optionally in an encrypted format, for use and storage by the vehicle wheel alignment system.

Alternatively, as a method, the present invention embodies the utilization of internet-based communications by dynamically generating an index of available automotive vehicle data sets on a web server in response to a query from a vehicle wheel alignment system. Desired automotive vehicle data sets are accessed and transferred to the requesting vehicle wheel alignment system utilizing web-pages and web-transfer protocols such as HTML and XML upon the exchange and verification of appropriate identification or purchase information.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

Figure 1:
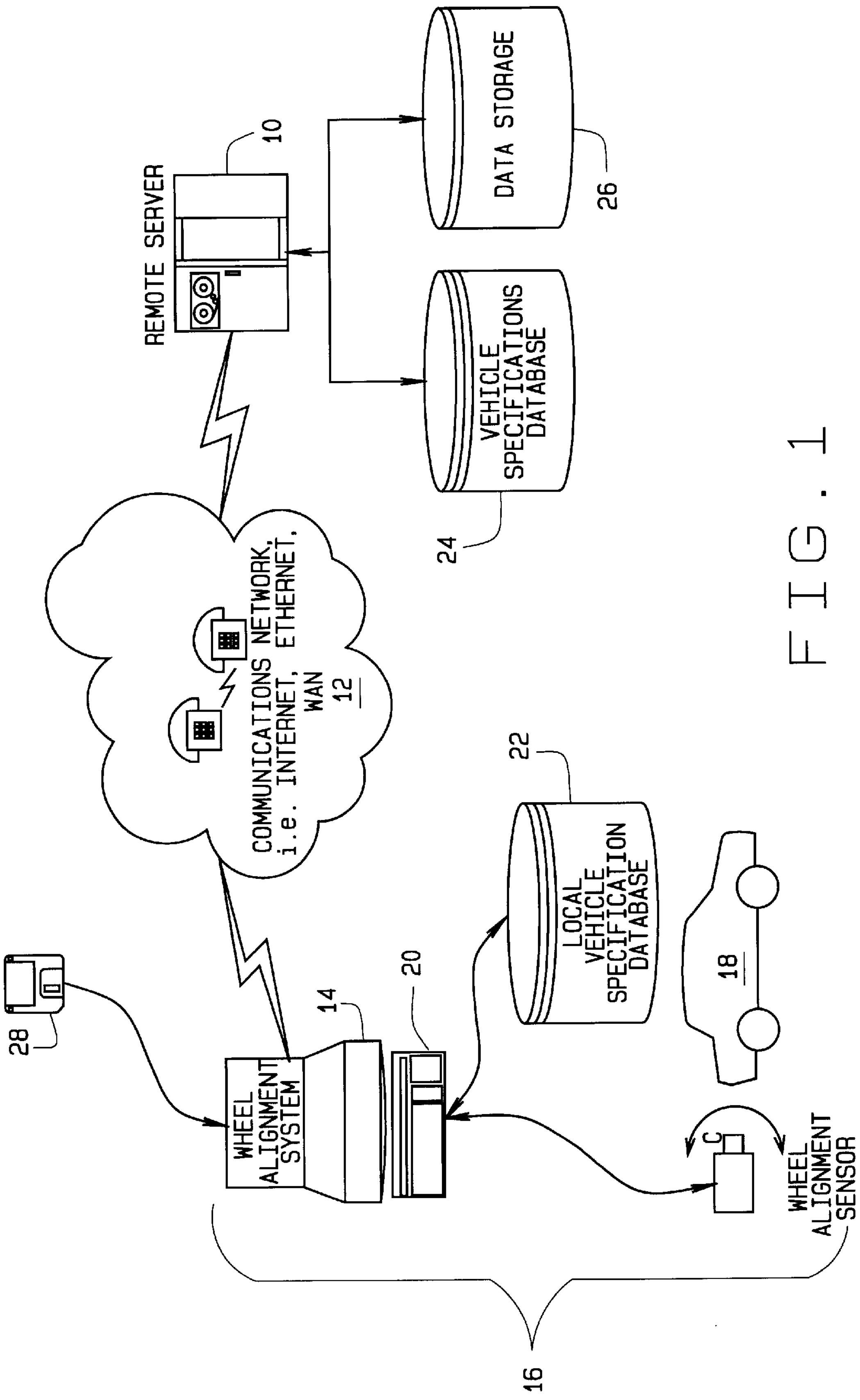
FIG. 1 is an overview of a wheel alignment system interconnected via a communications link to a remote server.

Updated information is critical to diagnosing, testing and servicing late model vehicles. As illustrated in FIG. 1, in order to receive the most current specifications, the vehicle information can be stored centrally on a remote computer or system accessible via a communications network, such as the Internet. In this manner, the vehicle information can be updated and altered at a central location as soon as the new data becomes available, eliminating delays in sending updated information to numerous individual users. Thus, in the preferred embodiment, a host computer, which may be a general purpose computer or a specialized logic circuit is adapted to allow for data communication with a remote computer via a communications network such as the Internet. It is to be understood that a conventional protocol for communicating with a local or global computer information network such as the Internet is implicit in the interconnection between the host computer, which may be running an Internet browser application, the remote computer which may be setup as an Internet web-server, and the communications network. In the case of a global communications network, the transmission control protocol/internet protocol (TCP/IP) presently is the preferred protocol, although it will be appreciated that protocols such as HTML and XML may be implemented and utilized without altering the scope of the invention. The host computer connects to the remote network using software residing on the host computer, and downloads updated specifications and vehicle information from the remote computer. It may be desirable for the information provider to verify the identity of the user or host computer before allowing access to the data by the host computer. This verification can be implemented through either software or hardware.

Figure 2:
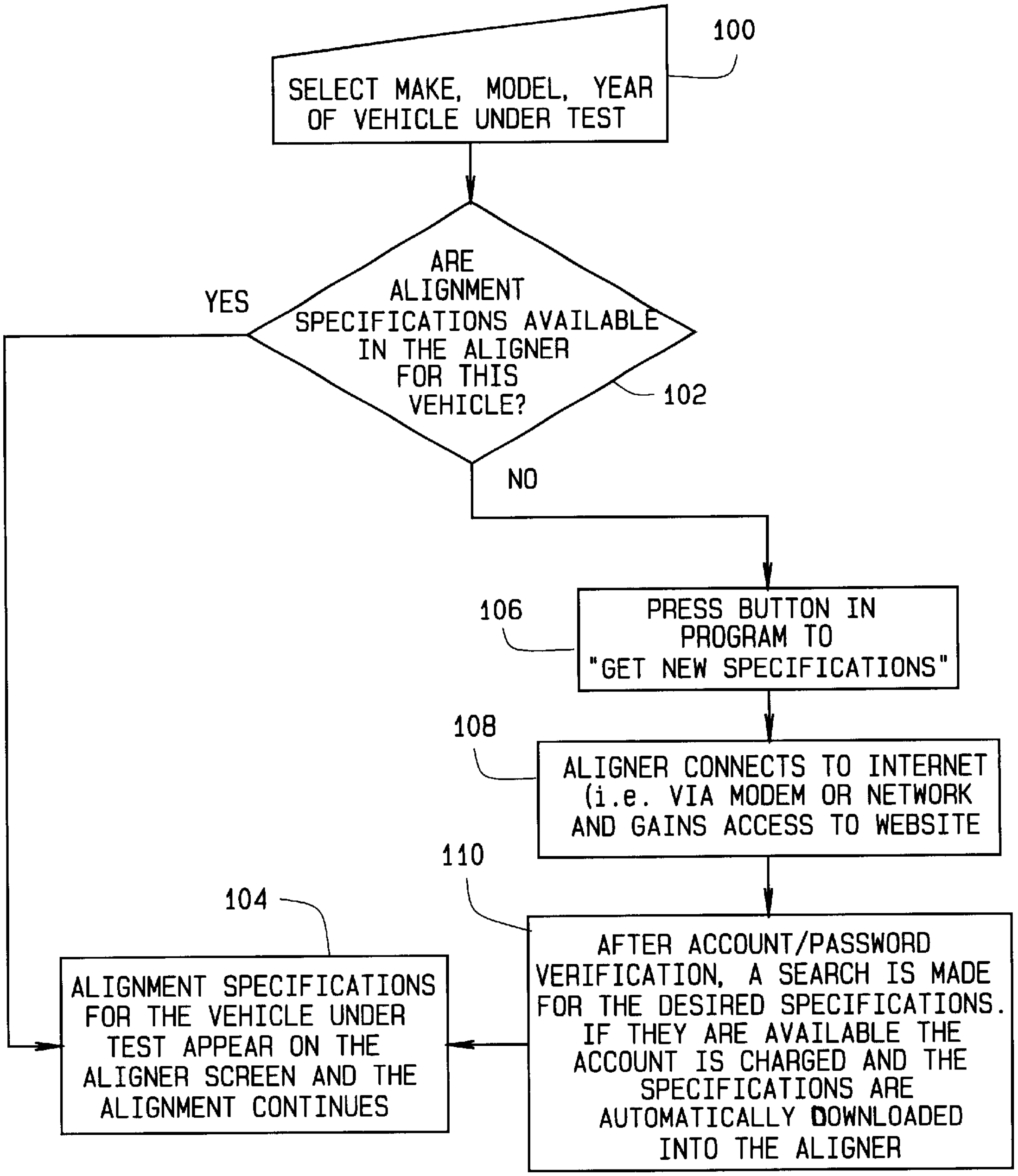
FIG. 2 is a flow chart of a software algorithm for updating vehicle information for use in a vehicle wheel alignment system.

Referring now to FIG. 1, an algorithm for updating vehicle information in a vehicle wheel alignment system is shown. The user or technician would input into the host computer or interface device the appropriate vehicle information describing the vehicle undergoing service by means of a keyboard or other input device. Such information may include the make, model, and year of the vehicle, as well as other identifying information if desired (Box 100). In the illustrative embodiment set forth in FIG. 2, wheel alignment specifications are employed to provide data relevant to wheel alignment applications. The vehicle wheel alignment software application stored in the host computer references the local database of vehicle specifications to determine whether a matching data set is stored in an associated computer database (Box 102). If a matching data set exists, the software application accesses the appropriate specifications from the local database and begins the service operation (Box 104). On the other hand, if no matching data set is found for the requested vehicle in the local database, the user is notified via the display of the need to obtain updated or additional vehicle specifications (Box 106).

Figure 3:
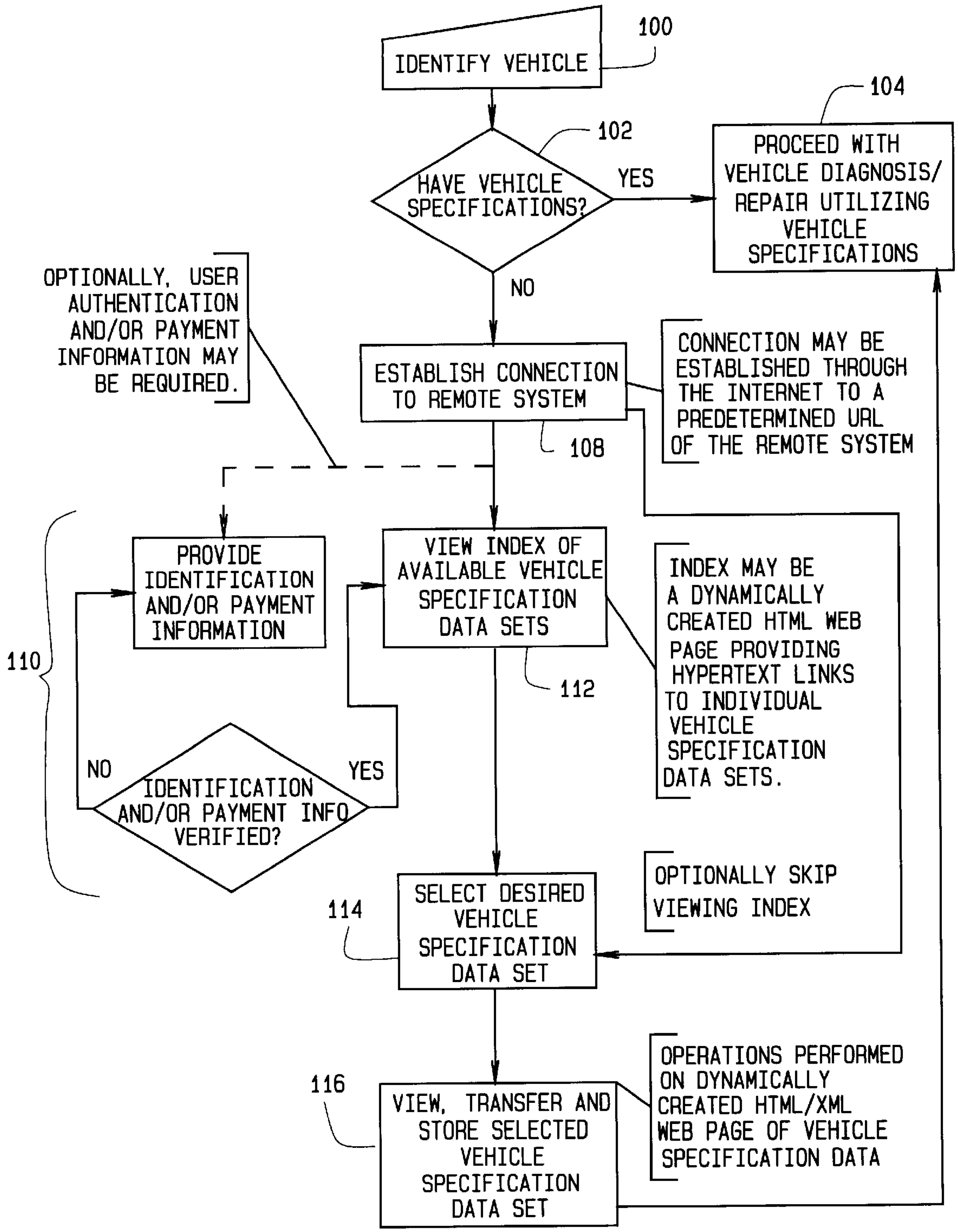
FIG. 3 is a flow chart illustration of a method of the present invention for obtaining HTML/XML vehicle specification data from a remote Internet-based system for use in a vehicle wheel alignment system.

In an embodiment of the present invention, illustrated in FIG. 3, the software operating on the host computer of the vehicle wheel alignment system provides the operator with an option to access a remote or "online" vehicle specifications database to retrieve updated or additional vehicle specifications. Upon selection by the operator of the online vehicle specifications database, the software then issues appropriate commands to communications hardware associated with the host computer, such as a modem or network card, to establish a connection to the remote system via the communications network to obtain current vehicle data (Box 108). The software establishes a connection to a local or global computer information network (e.g., the Internet), and through appropriate identification and authorization protocols, links to the remote computer or system wherein the updated specifications reside. In the preferred embodiment, the software operating on the host computer initiates an Internet browser application, establishing a communications link between the host computer of the vehicle wheel alignment system and a predefined URL (web address) on the remote computer or system running a web-server application, such as ColdFusion™, wherein the updated or new vehicle specifications are stored.

Access to the requested information can be challenged with an authorization request, such as a user name and password (Box 110). In the preferred embodiment, the user is prompted for the user name and password upon the initiation of the Internet browser application, and each automotive diagnostic device is assigned a unique identifier. The unique identifier may be either a software serial number, a hardware security key serial number, or other identifier unique to the automotive service device, and may include a temporal data field containing one or more dates. Software serial numbers such as those commonly found in Internet browser application "cookie" files or uniquely associated with individual software applications such as an automotive diagnostic application upon installation, and which are subsequently stored for future reference, may be utilized.

If utilized, hardware electronic security keys preferably are included in the interface device itself. The electronic keys are placed in a socket (not shown) associated with an electronic key holder in the vehicle wheel alignment system. The electronic keys can be used to protect the software from being installed on non-authorized systems, to provide access to premium features such as the online vehicle specification databases, and to allow special procedures for custom accounts. The electronic keys used in the preferred embodiment of the present invention are sold by Dallas Semiconductor under model number DS1992L-F5.

In an alternate embodiment, the user of the vehicle wheel alignment system purchases, in advance, a "license" to access the online vehicle specifications, and either chooses or is provided with a unique user identification and/or an access authorization such as a password. When accessing the online vehicle specifications, the user must provide the correct password and/or the associated unique user identification, which is then compared with information stored on the online or remote system. If the comparison indicates that the information supplied is correct, and has not expired as of the current date, access to the online vehicle specifications is granted. In the event there is a discrepancy, the user is requested to re-enter the identification and password.

Several different methods may be utilized to determine if a user's access authorization to the remote system has expired. For example in one embodiment, a database of authorized users is maintained on the remote system, which includes a expiration timestamp for each authorized user's access authorization. The expiration timestamp may be as simple as a year or month, or may be as detailed as a specific time of day on a particular date. When access to the remote system is requested by the user, the expiration timestamp for that user is compared against the current remote system timestamp, typically represented by the current time and date. If the comparison indicated that the expiration timestamp has passed, access to the remote system will be denied. In an alternative embodiment, the vehicle wheel aligner device which the user is utilizing to access the remote system is configured to transfer an aligner timestamp, typically the date and time setting on the vehicle wheel aligner device computer to the remote computer. This aligner timestamp is then compared with the current remote system timestamp to determine if the clock settings on the vehicle wheel aligner computer have been altered in an attempt to reset or reinstall software or access authorizations which are valid only for a predetermined period of time. In recognition that the accuracy of the date and time settings on computer systems have inherent inaccuracies, it is preferable that the comparison include a predetermined variance amount, typically twelve hours, within which access to the remote system will still be granted.

To further enhance the security of the system, the unique user identification and password may additionally be associated with a specific electronic security "specification" key or with another identifier unique to the vehicle wheel alignment system. In this manner, the unique user identification and password will only provide verified access to the online vehicle specifications from the single vehicle wheel alignment system at which the "specification" security key is installed, or which is associated with the unique identifier, reducing the risk of unauthorized access.

After the requested information is input by the user and transferred together with the unique identifier to the remote computer or system (Box $\mathbf{110}_A$), a software component object, such as may be implemented using the component object model (COM) or other software component techniques (DCOM or SOAP), running on the remote computer compares the information with stored records of authorized users to verify the validity of the user name and password and to determine any limitations which are to be placed on the user's access to the updated or new vehicle specifications (Box $\mathbf{110}_B$). If any information is incorrect, the user may be prompted to re-enter the requested information. In addition to restricting access to the online vehicle specifications to authorized users only, users can be charged for the service. If payment for access to the online vehicle specifications is required, it may by obtained through a conventional and well known exchange of either pre-established account information or the transfer and verification of credit card information.

Once the user's identification, authorization, and/or payment methods have been verified or confirmed, the remote computer or system may either directly provide access to a specific set of automotive vehicle data, or it may provide an index to the available data sets of automotive specifications, allowing the user to view and select from among a variety of choices (Box 112). Alternatively, the remote computer or system may be configured to deny the user access to the online specifications, and to merely provide a suitable message, indicating for example, that the user's account has been suspended for failure to make payments. In the preferred embodiment of the present invention, the remote computer or system is operating as a web-server, and is configured to dynamically generate an HTML index of available data sets of automotive vehicle specifications as one or more dynamic web pages. For example, the first web page generated may be an index to vehicle manufacturers or model years, providing a number of hierarchical or cross-links to additional web pages providing indices to particular vehicle makes, features, parts, or other specific information. The dynamically generated web page optionally may be customized in response to the user identification provided by the automotive service device. For example, automotive service devices providing user identification information which is associated on the remote system with a Saab dealership may be presented with a dynamically generated web page providing information related to Saab automotive vehicles in addition to the vehicle specification index. Additionally, the vehicle wheel alignment system may be configured to bypass the generated index, and directly access web pages containing the needed automotive vehicle specifications.

Upon the selection of a particular set of automotive vehicle specifications by the user, (Box 114) the remote computer or system will provide access to the requested data such that it will be transferred to, and optionally displayed for the user by the host computer of, the automotive service device (Box 116). The updated or new specification data is transferred to the user's local database associated with the host computer through conventional communication transfer protocols, such as HTML, WDDX, and XML. The host computer software may then access the appropriate specifications using a suitable software component object, such as may be implemented using the component object model (COM) or distributed component object model (DCOM), for example by parsing the HTML, WDDX, or XML data, for the particular vehicle being serviced, and begin the automotive service operation. Suitable COM software may be obtained from the ColdFusion™ web development software. The transferred and stored vehicle specifications are available to the automotive service device at any subsequent point in time, without the need for accessing the remote computer or system.

In the preferred embodiment, the display of the requested data on the vehicle wheel alignment system is done through the Internet browser application by the generation of a dynamic web page at the remote system, utilizing the HTML, WDDX, and XML protocols, and may include features such as hyperlinks to other automotive vehicle specifications, thumbnail digital images which may be utilized as links to enlarged digital images, numerical specifications, and other automotive vehicle information such as parts, repair information and instructional data, or technical service bulletins. Since the web pages of automotive vehicle specifications are created dynamically, languages other than English may be incorporated if requested by the user. Alternately, the display of the requested data on the vehicle wheel alignment system may not take place until the user returns to the automotive service application for which the data is needed, at which time the transferred and stored vehicle specifications are accessed and displayed as needed within the service application.

Upon the selection of a particular set of automotive vehicle specifications by the user, the remote system may be configured to request additional information from the host computer of the vehicle wheel alignment system, and to store information associated with the selection in a database. The requested packet of information, which may be supplied from the host computer of the vehicle wheel alignment system without the need for user interaction, may include detailed statistical information related to the status of the vehicle wheel alignment system. For example, the remote system may request version numbers of automotive diagnostic software installed on the host computer, logs of automotive repairs performed, identification of installed electronic security keys, and other statistical information. Information obtained from a number of host computers by the remote system may be stored and analyzed for statistical information as required. For example, by tracking which vehicle specifications are most frequently accessed via the remote system, repair trends and other economically useful information may be obtained. Information stored in association with an access to the remote system by the host computer of a vehicle wheel alignment system may include details such as the identification of the host computer (or user) and which vehicle specifications or data was retrieved. This information may then be utilized at a future date, for example, to identify users who have recently downloaded a vehicle specification set but for which an update is now available, thereby enabling the remote system to send a message to those users informing them of the updated information. Those of ordinary skill in the art will appreciate that the stored information regarding access to the remote system may be utilized in a wide variety of ways, including the gathering of statistical information, marketing purposes, and tracking.

Figure 4:
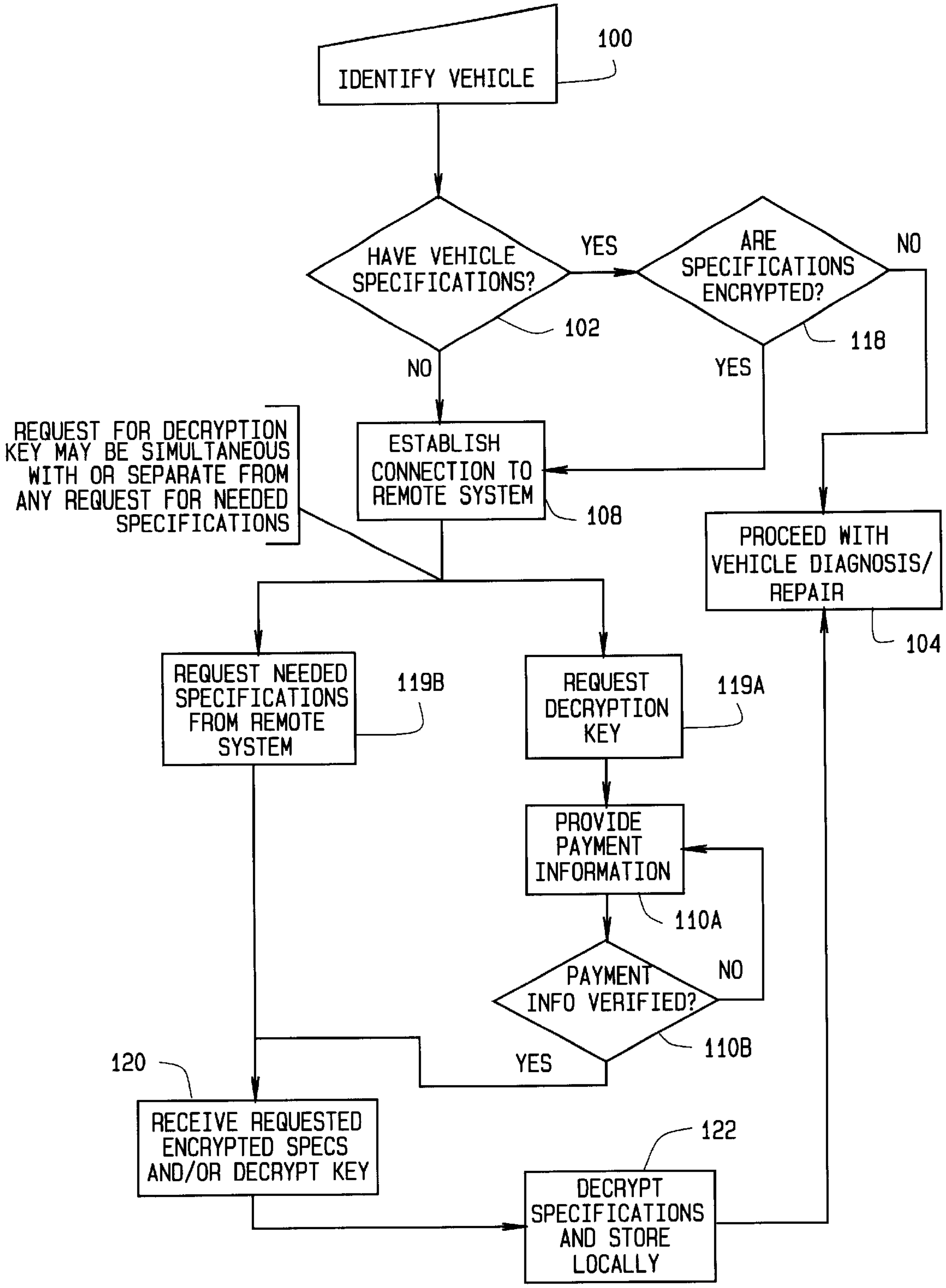
FIG. 4 is a flow chart illustration of a method of the present invention for obtaining a set of encrypted vehicle specifications and an associated decryption key from a remote system for use in a vehicle wheel alignment system.

In an alternative method shown in FIG. 4, a vehicle wheel alignment system may be provided with an encrypted database containing numerous current and up-to-date automotive vehicle specifications on a regular basis, such as by mailing of a CD-ROM, downloading via the Internet, or similar routine update (Box 118). Encrypted databases downloaded from the Internet optionally may not include all of the information or features found on the CD-ROM versions of the databases, so as to compress the database and to reduce download time. Additionally, the user may be provided database options either by the vehicle wheel alignment software application, or by the remote system, and choose only to download partial databases of updated vehicle specifications. For example, a Ford dealership may only require access to updated information on Ford motor vehicles, and elect to purchase only that information at a cost reduced from that of acquiring the full database of updated vehicle specifications.

Access to the encrypted information may be regulated by the need to decipher or decrypt the information into an understandable format. An exemplary encryption/decryption methodology is the BlowFish™ encryption algorithm, although any strong encryption technique may be employed. Accordingly, in the alternative method, a vehicle wheel alignment system is configured to establish a communications link with a remote computer via a communications network such as the Internet, as described above (Box 108), and to obtain the necessary decryption information. As described above, user identification information and purchase information is transferred from the vehicle wheel alignment system to the remote computer or system, however, upon receipt and verification of the user identity and payment information, the remote computer or system generates and returns a unique decryption key file associated with the encrypted database of information downloaded or installed at the vehicle wheel alignment system (Box 120), instead of a set of automotive vehicle specifications.

Alternatively, the connection to the remote computer or system may be established from a separate computer, rather than from the automotive service device, provided the information necessary to obtain the decryption key file associated with the vehicle wheel alignment system is known and provided to the remote computer or system. In turn, the remote compute or system will generate the decryption key file, and transfer it to the separate computer for storage on a floppy disk or other storage media for subsequent transfer to the vehicle wheel alignment system.

The decryption key file is preferably a small file, containing encryption information which authorizes access to the encrypted data stored in the periodically updated database (Box 122). To generate a unique decryption key file, it is preferred that the contents of the key file be created using a unique identifier, such as a security key, associated with the vehicle wheel alignment system requesting the key file, thereby preventing the use of the decryption key file on other wheel alignment systems. When received, the wheel alignment software application installs the decryption key file in a predetermined location on the host computer to facilitate future access to the encrypted data without the need to obtain a second decryption key file.

It will be readily understood that the method for encryption of vehicle specification databases and the need to obtain a decryption key prior to access thereto may be applied to the downloading of individual vehicle specifications described in previous embodiments as well as to entire or partial databases of vehicle specifications.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In an automotive service system linked to the Internet, a host computer configured to transfer data over the Internet and for storing a first plurality of vehicle data sets, and a remote computer configured to transfer data over the Internet and for storing a second plurality of vehicle data sets, an improvement comprising:

said host computer configured to respond to input vehicle identifying information to identify a need to obtain at least one specific vehicle data set from said remote computer;

said host computer further configured to utilize said input vehicle identifying information to generate a request for at least one specific vehicle data set from said remote computer;

said remote computer configured as an Internet web server to respond to said request from said host computer to dynamically generate at least one customized web page containing said at least one specific vehicle data set from said second plurality of vehicle data sets for transfer to said host computer over the Internet; and wherein said host computer is further configured to incorporate said transferred data set into said first plurality of vehicle data sets for use with current and subsequent vehicle wheel service procedures.

2. The improved automotive service system of claim 1 wherein said host computer is a component in a vehicle wheel alignment system having at least one sensing device for acquiring wheel alignment data, said host computer including interface circuitry in communication with said at least one sensing device for generating data representative of said acquired wheel alignment data, and said host computer configured to utilize said generated data to provide a representation of vehicle wheel alignment to an operator.

3. The improved automotive service system of claim 1 wherein said host computer is further configured to utilize said received information to retrieve at least one set of vehicle specifications from data storage, said at least one set of vehicle specifications utilized together with said generated data to provide a representation of said vehicle wheel alignment.

4. The improved automotive service system of claim 3 wherein said at least one set of vehicle specifications are encrypted in data storage.

5. The improved automotive service system of claim 4 wherein said received information is a cryptographic key, said host computer configured to utilize said cryptographic key to decrypt said at least one set of vehicle specification from encrypted data storage.

6. The improved automotive service system of claim 3 wherein said retrieved set of vehicle specifications includes manufacturer's wheel alignment specifications.

7. The improved automotive service system of claim 3 wherein said retrieved set of vehicle specifications includes one or more thumbnail digital image links.

8. The improved automotive service system of claim 3 wherein said retrieved set of vehicle specifications include instructional data.

9. The improved automotive service system of claim 3 wherein said retrieved set of vehicle specifications include service parts data.

10. The improved automotive service system of claim 1 wherein said transferred data set from said remote computer includes at least one set of vehicle wheel alignment specifications.

11. The improved automotive service system of claim 1 wherein said host computer is configured to provide a user with an option to utilize said first plurality of vehicle data sets.

12. The improved automotive service system of claim 11 wherein said host computer is configured to provide a user with an option to access said second plurality of vehicle data sets.

13. The improved automotive service system of claim 1 wherein said remote computer is configured to encrypt said copy of said at least one specific vehicle data set prior to transfer to said host computer over the Internet.

14. The improved automotive service system of claim 13 wherein said host computer is configured to decrypt said encrypted copy of said at least one specific vehicle data set received over the Internet.

15. The improved automotive service system of claim 1 wherein said at least one specific vehicle data set is an updated version of an original vehicle data set included in said first plurality of vehicle data sets, host computer configured to replace said original vehicle data set with said updated version.

16. The improved automotive service system of claim 1 wherein said remote computer is configured to utilize HTML to generate, in response to said request from said host computer, an index of selectable links to said at least one specific vehicle data set available in said second plurality of vehicle data sets.

17. A method for supplementing vehicle information stored in a vehicle wheel alignment system having a local database of vehicle information, the method comprising the steps of:

identifying a vehicle;

searching the local database for vehicle data associated with said identified vehicle;

responsive to said search of the local database, establishing a communications link between the vehicle wheel alignment system and at least one remote computer system;

retrieving via said communications link, a dynamically generated data packet containing vehicle data associated with the identified vehicle;

extracting said vehicle data from said data packet; and utilizing said extracted vehicle data in the service of said identified vehicle.

18. The method of claim 17 for supplementing vehicle information stored in a vehicle wheel alignment system further comprising the steps of:

communicating from said vehicle wheel alignment system to said remote computer system at least one payment option; and verifying at said remote computer system validity of said at least one payment option.

19. The method of claim 17 for supplementing vehicle information stored in a vehicle wheel alignment system wherein said communications link between said vehicle wheel alignment system and at least one remote computer system is established responsive to said search failing to identify vehicle data associated with the identified vehicle.

20. The method of claim 17 for supplementing vehicle information stored in a vehicle wheel alignment system wherein said communications link between said vehicle wheel alignment system and at least one remote computer system is established responsive to said search identifying outdated vehicle data associated with the identified vehicle.

21. The method of claim 17 for supplementing vehicle information stored in a vehicle wheel alignment system further including the step of incorporating said extracted vehicle data into the local database for subsequent access.

22. The method of claim 17 for supplementing vehicle information stored in a vehicle wheel alignment system wherein said retrieved dynamically generated data packet containing said vehicle data is a web page, said extracting step including extracting said vehicle data from said web page.

23. The method of claim 22 for supplementing vehicle information stored in a vehicle wheel alignment system wherein said dynamically generated web page includes XML data.

24. In an automotive service system having a communications link, a host computer configured to transfer data over said communications link and for storing a first plurality of vehicle data sets, and a remote computer configured to transfer data over said communications link and for storing a second plurality of vehicle data sets, an improvement comprising:

said host computer configured to request at least one specific vehicle data set from said remote computer;

said remote computer configured to respond to a request from said host computer to generate a custom data packet containing a copy of said at least one specific vehicle data set from said second plurality of vehicle data sets, said remote computer further configured to transfer said custom data packet to said host computer over said communications link; and said host computer further configured to extract said copy of said at least one specific vehicle data set from said transferred custom data packet and to incorporate said transferred vehicle data set into said first plurality of vehicle data sets.

25. The improved automotive service system of claim 24 wherein said host computer is configured to incorporate said transferred copy of said at least one specific vehicle data set into said first plurality of vehicle data sets for subsequent access thereto.

26. The improved automotive service system of claim 24 wherein said remote computer is configured to utilize HTML and XML to generate said custom data packet containing said copy of said at least one specific vehicle data set in response to said request from said host computer.

27. The improved automotive service system of claim 26 wherein said at least one specific vehicle data set includes digital image data.

28. The improved automotive service system of claim 26 wherein said at least one specific vehicle data set includes vehicle repair data.

29. A method for providing automotive vehicle information from a remote system configured as an Internet web server, to a vehicle service device having a host computer, through the Internet, the method comprising the steps of:

providing vehicle identifying information;

communicating a request for said at least one vehicle data set from said remote system over the Internet;

generating, at said remote system at least one customized data packet containing said at least one vehicle data set;

transferring said at least one dynamically generated custom data packet containing said at least one set of vehicle data associated with said vehicle identifying information from said remote system to said host computer over the Internet;

extracting said at least one set of vehicle data from said at least one transferred custom data packet; and utilizing said acquired set of vehicle data in the service of an automotive vehicle.

30. The method of claim 29 for providing automotive vehicle information from a remote system to a vehicle service device further including the steps of:

communicating an access authorization to said remote system;

verifying at said remote system validity of said access authorization prior to generating said at least one customized data packet; and wherein the step of verifying said access authorization requires comparing an expiration timestamp associated with said access authorization with a current timestamp; and rejecting validity of said access authorization if said expiration timestamp has passed.

31. The method of claim 30 for providing automotive vehicle information from a remote system to a vehicle service device wherein the step of verifying said access authorization further requires comparing a host computer timestamp received at said remote system from said vehicle service device with said current timestamp; and rejecting validity of said access authorization if said host computer timestamp varies from said current timestamp by more than a predetermined amount.

32. The method of claim 29 for providing automotive vehicle information from a remote system to a vehicle service device further including the steps of encrypting said vehicle data set prior to transfer; and decrypting at said vehicle service device said extracted vehicle data set.

33. The method of claim 29 for providing automotive vehicle information from a remote system to a vehicle service device wherein, responsive to said vehicle service device, generating at said remote system at least one HTML web page including links to said at least one vehicle data set to be provided from said remote system to said vehicle service device.

34. The method of claim 29 for providing automotive vehicle information from a remote system to a vehicle service device further including the steps of:

providing from said remote system to said vehicle service device over the Internet, an index identifying at least one vehicle data set available from said remote system; and selecting, through said vehicle service device at least one available vehicle data set.

35. The method of claim 34 for providing automotive vehicle information from a remote system to a vehicle service device wherein said step of generating at least one customized data packet containing said at least one vehicle data set includes dynamically creating a web page containing said at least one vehicle data set.

36. The method of claim 29 for providing automotive vehicle information from a remote system to a vehicle service device wherein said generated custom data packet includes XML data.

37. The method of claim 29 for providing automotive vehicle information from a remote system to a vehicle service device wherein said at least one acquired vehicle data set includes vehicle wheel alignment specifications.

38. The method of claim 29 for providing automotive vehicle information from a remote system to a vehicle service device further including the step of storing said acquired set of vehicle data for subsequent access.

39. A method for providing automotive vehicle information from a remote system to a vehicle wheel alignment device through a communications link, the method comprising the steps of:

providing said vehicle wheel alignment device with vehicle identifying information;

directing said vehicle wheel alignment device to utilize said vehicle identifying information to obtain automotive vehicle data from said remote system over said communications link;

providing from said remote system to said vehicle wheel alignment device over said communications link, an index identifying at least one set of automotive vehicle data available from said remote system;

selecting, through said vehicle wheel alignment device at least one set of automotive vehicle data available from said remote system;

transferring from said vehicle wheel alignment device to said remote system at least one packet of statistical information related to said vehicle wheel alignment device following said selecting of at least one set of automotive vehicle data available from said remote system;

analyzing, at said remote computer, said transferred at least one packet of statistical information;

providing from said remote system, access to said selected set of automotive vehicle data over said communications link, acquiring at least one set of automotive vehicle data associated with said vehicle identifying information from said remote system over said communications link;

storing said acquired set of vehicle data for subsequent access;

utilizing said acquired set of automotive vehicle data in the service of an automotive vehicle;

wherein the step of analyzing said transferred at least one packet of statistical information includes identifying the configuration of said vehicle wheel alignment device; and wherein identifying the configuration of said vehicle wheel alignment device identifies a accessory configuration of said vehicle wheel alignment device, including at least one of the set of identification of installed electronic security keys, identification of an installed automotive diagnostic software revision.

40. A method for providing automotive vehicle information from a remote system to a vehicle wheel alignment device through a communications link, the method comprising the steps of:

providing said vehicle wheel alignment device with vehicle identifying information;

directing said vehicle wheel alignment device to utilize said vehicle identifying information to obtain automotive vehicle data from said remote system over said communications link;

acquiring at least one set of automotive vehicle data associated with said vehicle identifying information from said remote system over said communications link;

compiling tracking data at said remote computer, associated with said access to selected sets of automotive vehicle data;

storing said acquired set of vehicle data for subsequent access;

utilizing said acquired set of automotive vehicle data in the service of an automotive vehicle; and utilizing said compiled tracking data at said remote computer to identify statistical information including at least one of set of frequency of access to individual vehicle specification sets, vehicle wheel alignment repair trends, frequency of access by individual host computers.

41. The method of claim 40 wherein said step of compiling tracking data at said remote computer includes storing identification of said vehicle wheel alignment device and storing identification of said selected sets of automotive vehicle data.

42. The method of claim 41 further including the step of, at a later point in time, utilizing said compiled tracking data at said remote computer to signal said vehicle wheel alignment device of an availability of at least one update to said selected sets of automotive vehicle data.

43. A vehicle wheel alignment system having at least one sensing device for acquiring wheel alignment data, interface circuitry in communication with said at least one sensing device for generating data representative of said acquired wheel alignment data, and a general purpose computer configured to utilize the generated data and input vehicle identification data to provide a representation of vehicle wheel alignment to an operator, an improvement comprising:

said general purpose computer programmed to:

communicate over the Internet to at least one remote information database a request for remote vehicle data associated with the input vehicle identification data, receive a dynamically generated custom data packet containing said remote vehicle data associated with the input vehicle identification data from said at least one remote information database, and extract said remote vehicle data from said custom data packet;

utilize at least one of the set of said local vehicle data and said extracted remote vehicle data to provide the representation of vehicle alignment to the operator.

44. The vehicle wheel alignment system of claim 43 wherein said general purpose computer is further programmed to incorporate said extracted remote vehicle data into said at least one local information database for subsequent access thereto.

* * * * *